United States Patent [19]

Wurtz

[11] Patent Number: 5,196,043
[45] Date of Patent: Mar. 23, 1993

[54] DELAYED, EXOTHERMIC, ALKALINE STERILIZATION METHOD FOR TREATING WASTEWATER SLUDGES

[75] Inventor: William O. Wurtz, Paramus, N.J.
[73] Assignee: Willow Technology, Inc., Toms River, N.J.
[21] Appl. No.: 646,659
[22] Filed: Jan. 25, 1991
[51] Int. Cl.$^5$ ............... C02F 11/00; C02F 1/68; C05F 7/00
[52] U.S. Cl. ............... 71/12; 71/21; 71/64.05; 71/903; 210/609; 210/751; 210/764
[58] Field of Search ............... 71/12-14, 71/21-23, 63, 64.05, 903; 210/609, 751, 764, 910

[56] References Cited

U.S. PATENT DOCUMENTS

| | | | |
|---|---|---|---|
| 4,226,712 | 10/1980 | Kamei | 71/12 X |
| 4,270,279 | 6/1981 | Roediger | 34/9 |
| 4,306,978 | 12/1981 | Wurtz | 71/12 X |
| 4,554,002 | 11/1985 | Nicholson | 71/12 |
| 4,781,842 | 11/1988 | Nicholson | 210/751 |
| 4,902,431 | 2/1990 | Nicholson | 210/751 |
| 4,997,572 | 3/1991 | Wurtz | 210/710 |
| 5,013,458 | 5/1991 | Christy, Sr. et al. | 210/751 |

OTHER PUBLICATIONS

Roy, "Innovative Technology finds a newally—NETAC" Jul. 1990, Hazmat World, pp. 35–38.

Primary Examiner—Ferris Lander
Attorney, Agent, or Firm—Collard & Roe

[57] ABSTRACT

A method and product for sterilizing and drying waste products such as plant sludge, animal excrement and process wastes wherein the waste material is first settled or dewatered to a moisture content between 4% to 60% and then blended and reacted with alkaline earth metal oxides in the presence of an atmosphere of carbon dioxide, and in the absence of the oxygen. After the sludge is blended with the alkaline earth oxides, the carbon dioxide is removed so that air or oxygen will contact the blended constituents. A violent exothermic reaction takes place between the water in the constituents and the alkaline earth oxides causing a rapid rise in temperature of the constituents and thus sterilizing the constituents to produce a safe and useable end product.

19 Claims, 1 Drawing Sheet ically, the present invention relates to reacting alkaline materials, such as calcium oxide, cement kiln dust, lime kiln dust or similar alkaline materials and combinations thereof with wastewater sludge or animal excrement as well as carbon dioxide gas or carbon dioxide solids in a reactor so as to provide a well blended mixture that reacts exothermically after discharge from the reactor, providing temperatures exceeding the boiling point of water, instantly drying said mixture through rapid evaporation of liquids, dramatically changing the appearance of the product so that the products meet or exceed regulatory requirements for beneficial use of waste materials while improving environmental quality and protecting human health.
DELAYED, EXOTHERMIC, ALKALINE STERILIZATION METHOD FOR TREATING WASTEWATER SLUDGES

BACKGROUND OF THE INVENTION

1. Field of the Invention

The present invention relates to an improved method for combining waste materials to produce valuable products for agricultural, horticultural, sylvicultural or public use.

Specifically, the present invention relates to a delayed exothermic reaction of alkaline materials with waste materials, such as wastewater treatment plant sludge, animal excrement or process wastes, and additionally with carbon dioxide gas or carbon dioxide solids, to thereby convert said waste materials to useful products such as soil conditioners or fertilizer supplements.

More specifically, the present invention relates to reacting alkaline materials, such as calcium oxide, cement kiln dust, lime kiln dust or similar alkaline materials and combinations thereof with wastewater sludge or animal excrement as well as carbon dioxide gas or carbon dioxide solids in a reactor so as to provide a well blended mixture that reacts exothermically after discharge from the reactor, providing temperatures exceeding the boiling point of water, instantly drying said mixture through rapid evaporation of liquids, dramatically changing the appearance of the product so that the products meet or exceed regulatory requirements for beneficial use of waste materials while improving environmental quality and protecting human health.

2. Description of the Prior Art

Those skilled in sludge management practices are aware that methods for alkaline stabilization or decontamination of waste sludge are presently in use.

In his book titled "Treatment and Disposal of Wastewater Sludges", Ann Arbor Science Inc., publishers, 1979 Edition, P. Aarne Vesilind, reviews the practice of mixing lime and sludge in a common concrete mixer to yield a product which is marketable as a soil conditioner. The sludge is dried and disinfected as a result of an exothermic reaction which approaches (but does not exceed) 100° C.

U.S. Pat. No. 4,226,712 dated Oct. 7, 1980 by Kamei discloses a method of treating water containing wastes by first mixing the waste with an alkaline earth metal oxide such as calcium oxide as a preliminary drying step followed by a second step of removing additional water by drying means at temperatures from 800° C. to 1,450° C. During the first step, the organic sludge is "partly gelated". Kamei also teaches that "the mixture thus heated by the exothermic reaction to a temperature from about 80° C. to 90° C." Additionally, Kamei teaches that the high temperatures do not decompose the organic constituents contained in organic waste and remain in the final product. The sterilized products are used as fertilizers.

In U.S. Pat. No. 4,270,279 dated Jun. 2, 1981, Roediger teaches a method for alkaline stabilization of dewatered sludge cake which results in the formation of sterilized pellets. The claim is that an inexpensive method is provided for sterilizing dewatered sludge cake which is discharged from belt presses wherein the sludge cake is broken into ball-like particles having diameters ranging from 1 to 10 millimeters, dusting these particles with quicklime (calcium oxide) and achieving temperatures "of the bulk matter to about 70° C. to 80° C." The quicklime reacts exothermically with the surfaces of said ball-like particles resulting in a product which can be used as an agricultural product. To achieve complete sterilization, the treated waste had to be stored for four hours. The means for mixing and reacting the sludge with quicklime includes a paddle blender or pug mill.

The RDP Company, Plymouth Meeting, Pa. advertises a so-called "Envessel Pasteurization" process. The process description is that of a screw conveyor or pug mill type mixer that enables reacting dewatered sludge cake and quicklime exothermically, discharging into a jacketed holding hopper, with "supplemental heat added to the vessel to insure the mixture maintains a temperature of 158° F./70° C. for a period of 30 minutes". This process produces a product meeting regulatory agency requirements for PFRP, Process to Further Reduce Pathogens.

U.S. Pat. No. 4,554,002 dated Nov. 19, 1985, granted to Nicholson, discloses a method for beneficiating "low percentage solids" waste water treatment sludge, without prior dewatering, by mixing kiln dust containing a percentage of calcium oxide to form a solidified, disintegratable, friable product which can be eventually granulated after curing and aging for a sufficient period of time. A product is produced which can be applied to land as well as used as a soil conditioner and fertilizer supplement.

Nicholson also disclosed improved methods for treating wastewater sludge in U.S. Pat. Nos. 4,781,842 and 4,902,431. The method "decontaminates" wastewater sludge to a level that meets or exceeds U.S. EPA Process to Further Reduce Pathogens standards. The method mixes sludge with alkaline materials sufficient to raise the pH of the mixture to 12 and above for at least one day, and then the mixture is dried to produce a granular material. So-called "decontamination" is the process of exothermically reacting alkaline materials with sludge to raise the temperature to about 50° C., but not to temperatures sufficient to cause sterilization, thereby reducing and/or eliminating pathogenic microorganisms, but maintaining beneficial non-pathogenic microorganisms, and coupling this step with drying, such as windrowing, to produce a PFRP product.

In U.S. Pat. No. 4,306,978 dated Dec. 22, 1981, entitled "Method for Lime Stabilization of Wastewater Treatment Plant Sludges", granted to the applicant, the subject matter of which is incorporated herein by reference thereto, a method for lime stabilization of wastewater treatment plant sludge is disclosed. The method includes the steps of dewatering sludge and rapidly and intimately mixing and reacting sludge cake with quicklime (calcium oxide) so as to produce stabilized sludge pellets.

In U.S. patent application Ser. No. 546,426 for "Improved High Rate Method for Alkaline Stabilization, Beneficiating and Pelletizing of Wastewater Treatment Plant Sludges now U.S. Pat. No. 4,997,572," also by the applicant, an improved method is disclosed which exothermically reacts alkaline materials with waste material, beneficiates said materials, and forms pellets having a skin of calcium carbonate. The carbonates are formed as the last step of the process by reaction of calcium hydroxide, contained in the pellet, with carbon dioxide gas or carbon dioxide solids (dry ice).

The aforesaid patented methods of the applicant are advantageously and efficiently accomplished in a blender-dryer-reactor invented by the applicant and described in U.S. Pat. No. 3,941,357. The method of U.S. Pat. No. 4,306,978 and the applicants patented apparatus have been widely accepted by the pollution control industry with many successful installations in the United States.

Many of the aforesaid methods of alkaline stabilization or decontamination are presently in practice today, but all have limitations when compared to the new method of the applicant. Because of the increasing demand for viable alternative for disposing of waste materials and the promotion of practices that provide for beneficial use of sludge, the new inventive method addresses the limitations of present methods and provides a beneficial product from waste materials that not only will have appeal for public use by virtue of its physical appearance, but more importantly, because of the high rate, subsequent instant drying with high efficiency, can be shipped long distances without fear of degradation so that said products can be economically used as fertilizer supplements in third world countries.

When compared to the instant invention, none of the aforesaid methods teach the method of obtaining of temperatures in excess of 100° C., such as temperatures up to or exceeding 117° C., which result from the exothermic reactions. Neither do any of the methods delay or retard the exothermic reaction so that the chemical reactions can take place with high efficiency after a highly accurate blending of the components of the mixtures is assured. Those skilled in the art of mixing, blending and reacting materials recognize that materials cannot be commingled or dispersed accurately as said materials are changing stage or state. Another limitation of present inventions is the relatively long drying periods when dried by natural means such as air drying, or the additional equipment and fuel required for drying in a drying apparatus. This compares to the subsequent relatively instant drying as the exothermic reaction takes place at high temperatures exceeding 100° C. for the new method.

Extended drying periods also require costly land storage area as well as additional labor and material handling to transport material to and from said storage area.

Most of the products provided by the methods presently in use have moisture content ranging from 10% to 35%. The products having the least amount of moisture require drying periods of at least 30 days. This is another limitation of the present methods in that the new process can selectively provide a moisture content in the product, ranging from 50% to less than 10%, by varying the ratios of components of the mixture and reaction. Additionally, the new product is so well blended, reacted and dried, that there remains no pockets of unblended material and therefore no pockets containing a higher moisture content which could cause spoilage or degradation over periods of time. The uniform drying of the new inventive product enables its packaging and shipping over long distances without degradation.

The color of products produced by presently existing methods range from black to light gray, whereas the new product has an off-white appearance. This off-white appearance is more acceptable to the public since it does not resemble a product made from waste sludge.

It is accordingly an object of the present invention to provide a novel, improved method for reacting alkaline materials, carbon dioxide and waste materials, such as wastewater sludge, animal excrement or process wastes in a conventional blender-reactor, preferably a plow blender type so as to provide a delayed exothermic reaction after discharge from the blender-reactor, the reaction resulting in the beneficial use of waste materials while improving environmental quality and protecting human health.

It is a further objection of the invention to provide a method of treating sludge wherein temperatures exceeding the boiling point of water are obtained with subsequent relatively instant drying through rapid evaporation of liquids from waste materials while dramatically altering the appearance of the waste products.

It is also an object of the present invention to provide sterile products by thermal destruction of microorganisms, high dry solids content of the product, or a combination of thermal destruction and high dry solids content which is not life supporting.

Accordingly, the invention provides for the reduction in pathogens that is equivalent to and exceeds the reduction of other approved USEPA standards for PFRP, the Process to Further Reduce Pathogens, as per USEPA Appendix II of 40 CFR 257, which standards state in part as follows:

Heat drying: Dewatered sludge cake is dried by direct or indirect contact with hot gases, and moisture content is reduced to 10% or lower. Sludge particles reach temperatures well in excess of 80° C.

Other methods: Other methods of operating conditions may be acceptable if pathogen and vector attraction of the waste (volatile solids) are reduced to an extent equivalent to the reduction achieved by any of the above (other) methods.

In a 1985 memorandum regarding 40 CFR 257 regulations, the USEPA outlined another qualifying PFRP process, namely, the reduction of pathogenic bacteria, animal viruses, and parasites below detectable limits of one plaque forming unit (PFU) per 100 ml of sludge for animal viruses; three colony forming units (CFU) per 100 ml of sludge for pathogenic bacteria; and one viable egg per 100 ml of sludge for parasites. Additionally, vectors such as flies or rats should not be attracted to the product. Since Nicholson per U.S. Pat. Nos. 4,781,842 and 4,902,431 meets the aforementioned standard by providing temperatures of 50° C. and dryness of 65%, the new inventive process exceeds the temperatures of 50° C. with temperatures exceeding 100° C., and with a dryness exceeding 90%.

The present invention also beneficiates waste materials by synergistically combining waste materials such as waste sludge and kiln dusts to thereby effect soil conditioners and fertilizer supplements, the products containing nitrogen, phosphorus, potassium, trace nutrients and organic matter, as well as calcium from calcium carbonate, that can be land applied. The calcium carbonate of the product is known to degrade more slowly than hydrated lime and therefore provides beneficial slow release of alkalinity to cropland. The invention also eliminates the necessity for product storage or extra material handling. It provides a free flowing product that can be marketed as a free flowing powder or as granules, micro-pellets or pellets; have a innoxious odor; reduce vector attraction; reduce bulk density and color so that the products do not appear "sludge-like" to the general public.

The invention also converts and beneficiates waste materials into valuable products for utilization as soil conditioners or fertilizer supplements in agricultural applications for food and feed crops; for horticultural applications such as plants and use in nurseries; for sylviculture to increase forest productivity and revegetate forest lands devastated by fire, land slides, volcanos or other natural disasters; public use such as turf maintenance or production, strip mine reclamation, covering expired landfills; fertilizing highway median strips; or additionally addressing process waste for preparing process waste for approved landfill applications.

SUMMARY OF THE INVENTION

The method of the invention provides for the delayed exothermic sterilization, beneficiating and subsequent instant drying of wastewater sludge, animal excrement, or process waste using an efficient blender-reactor, which method has the steps of:

settling and/or dewatering the waste material to provide a sludge containing 3 to 60% by weight of dry solids;

efficiently blending and reacting the sludge with alkaline earth metal oxides such as calcium oxide (quicklime), beneficiating material, such as kiln dusts, and carbon dioxide so as to retard exothermic reactions and maintain temperature at or near room temperature;

discharging the accurately blended materials from the blender-reactor, prior to the exothermic reaction, into a holding hopper wherein the exothermic reaction initiates, said holding hopper optionally being maintained at atmospheric pressure or under vacuum;

rapidly evaporating liquids from the entire mass of the mixed materials as the temperature resulting from the exothermic reaction rapidly rises and exceeds the boiling point of said liquids entrained in the mass of mixed materials, said temperature capable of reaching 117° C. either at atmospheric pressure or under vacuum; causing a violent percolation of the blend of material as vapor escapes from every particle of the accurately blended mass of material and as the temperature of each particle reaches the boiling point of the liquid between, on or within each particle;

sterilizing the product by the relatively high temperature exothermic reaction, by the high dry solids content of the resulting product, or by a combination of heat and dryness so as to meet or exceed USEPA standards for PFRP, Process to Further Reduce Pathogens;

reducing or eliminating the odor of the product so that the odor is innoxious to a panel of individuals selected at random, while also reducing vector attraction;

changing the appearance of the sludge mixture from a wet, dark gray mass to an off-white, free flowing powder, which powder can find beneficial use as a powder; beneficiated with additional nutrients; granulated or pelletized for ease of material handling or land applying; and acceptable to industry and the general public for use in agriculture, horticulture, sylviculture or public use; and providing a product of sufficient uniform dryness, without pockets of moist material, to enable its packaging and shipping long distances, such as to third world countries to provide soil conditioners and fertilizer supplements to arid or non-productive land.

The means for settling and/or dewatering the sludges can be any conventional settling and/or dewatering equipment. The means for blending and reacting calcium oxide, kiln dust and carbon dioxide with sludge includes an efficient blender reactor with gasketed cover. The blender-reactor could be single or dual shaft paddle blenders, pug mills, plow blenders, ribbon blenders or pin mills. However, due to its proven blending accuracy for viscous materials, the preferred embodiment is a dual shaft plow blender-reactor as described in U.S. Pat. No. 3,941,357, which apparatus is also described in U.S. Pat. No. 4,306,978 and approved for U.S. patent application Ser. No. 546,426, for waste sludge treatment. The apparatus and methods of these patents are incorporated herein by reference.

The holding hopper is a conventional hopper with inlet and outlet connections, suited for vacuum service, with sufficient volume to permit expansion of the product as the product percolates and reduces bulk density to 30 to 80% of the density of the initial blend of materials. A dry air purge is also provided to purge the holding hopper of any excess carbon dioxide, water vapor and volatile odor producing substances. For vacuum service, pressure locks are provided to maintain vacuum conditions. Pressure locks can be conventional positive displacement sludge pump on the inlet side and conventional rotary locks for free flowing dry materials on the outlet.

The alkaline earth oxides blended with the waste sludge can be commercially available quicklime (calcium oxide), cement kiln dust, lime kiln dust or admixtures of these alkaline materials. Cement kiln dust is a waste by-product of the cement processing industry. It is known to be a substitute for calcium oxide or hydrated lime in processing of sewage sludge. Cement kiln dust composition includes $SiO_2$, $Al_2O_3$, $Fe_2O_3$, $CaO$, $M_EO$, $SO_3$, $Na_2O$, $K_2O$, and free $CaO$ with the highest percentage of the components being $CaO$ and $S_1O_2O$. The potassium, magnesium, calcium and trace nutrients, when blended with waste material, such as municipal wastewater treatment plant sludge, provide additional nutrients combined with the nitrogen and phosphorus in sludge to thereby find beneficial use as the aforesaid soil conditioners and fertilizer supplements. Lime kiln dust is a by-product of the processing of lime products and has the same characteristics as quicklime. Other alkaline materials can be substituted as long as the high heat exothermic reaction is obtained.

The carbon dioxide of the method is commercially available and supplied in pressurized cylinders or tanks. It can be dispensed either as a gas, or alternately, with the use of a special attachment, as carbon dioxide granules or flakes, commonly known as "dry ice".

The aforementioned objects and features of the present invention will become apparent from the following detailed description when taken in connection with the accompanying drawing, which drawing discloses embodiments of the invention.

DETAILED DESCRIPTION OF THE INVENTION

Figure 1:
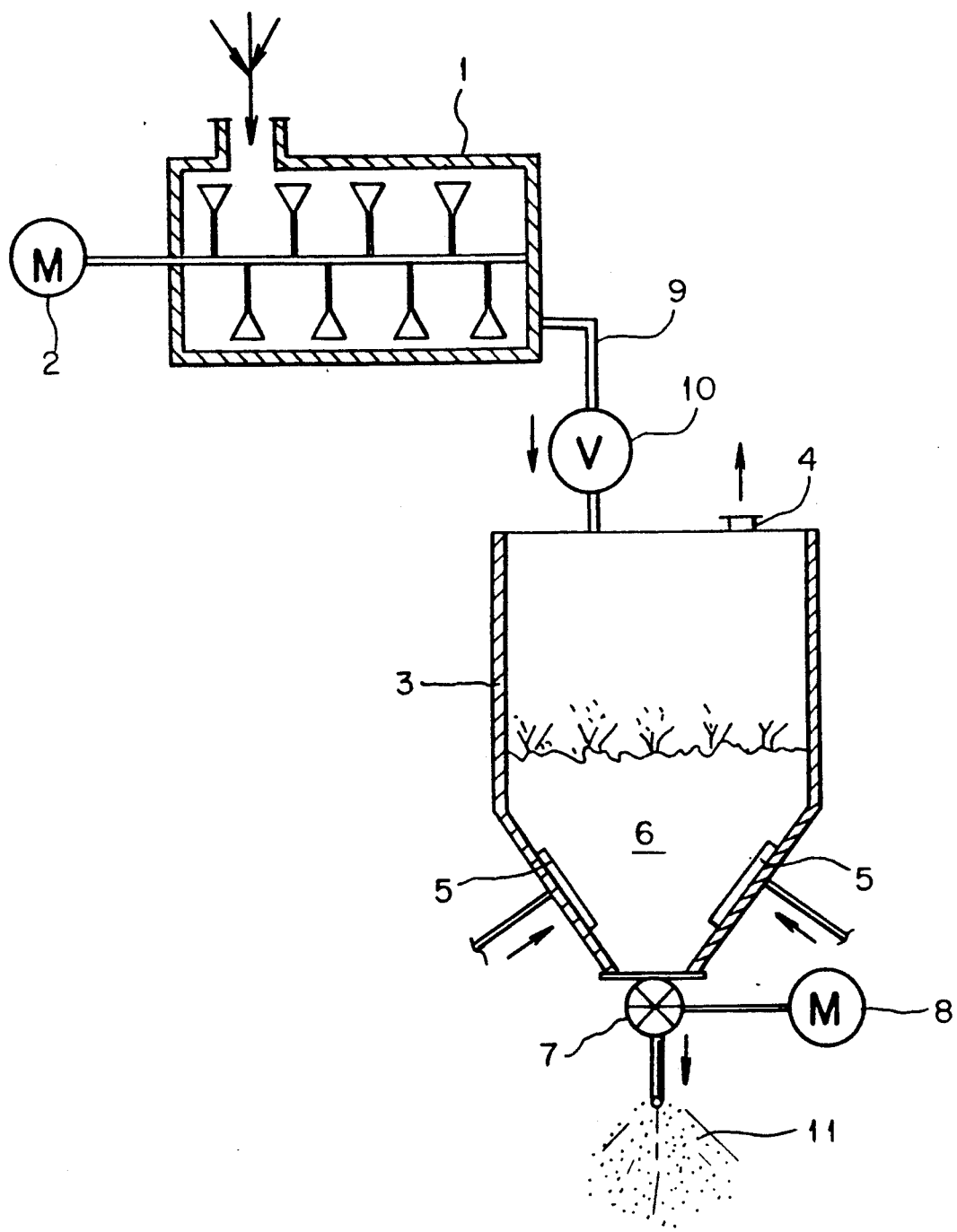
FIG. 1 is a flow diagram for the production of sterilized, beneficiated product resulting from the delayed exothermic reaction of waste sludge, alkaline earth oxides, and carbon dioxide.

Referring to FIG. 1, settled sludge or dewatered sludge, an alkaline metal oxide such as calcium oxide, and carbon dioxide are delivered continuously into a blender 1 to effect an efficient, accurate blending of the charged materials. While the process could be carried out in a batch mode, blender 1 is preferably operated in a continuous mode.

The settled sludge or dewatered sludge generally contains 4% to 60% dry solids. The alkaline earth oxides must contain sufficient free oxides to react exothermically with the free water of the sludge. For example, quicklime is known to have a high calcium oxide content up to 98%. Lime kiln dust, a by-product of lime processing, also has the same characteristics as quicklime with high calcium oxide content. Cement kiln dust has, as its major component, calcium oxide with free calcium oxide ranging from generally 0 to 15% of the total. The carbon dioxide can be charged into the blender either as a gas or as a solid. As a gas, it blends well with other materials since the gas is heavier than air. As a granular or flaked dry ice solid, commingling and dispersion of the carbon dioxide can take place so that as the solid sublimes, it is in contact with particles of the blended material thereby assuring a uniform reaction of all materials.

It should be noted that this step of adding carbon dioxide as the first step is in contrast to the applicant's patent application Ser. No. 546,426, in which carbon dioxide is added as the last step so as to react with the calcium hydroxide on the surface of the formed pellet and produce a hard skin of calcium carbonate on the pellet. When added as the first step, as in the present invention, complex reactions take place which delays the exothermic reaction, which delay is advantageous to the process. Air containing oxygen is thus excluded from the reaction, and results in unexpected heat release which is substantially higher than those methods presently in practice.

The determination of the ratios and flow rates of individual components of the mixture is determined by laboratory analysis. Since the object of the invention is to convert waste materials into beneficial products, it must be understood that the waste materials can vary widely in composition. Waste sludge can have varying dry solid and moisture contents. Kiln dusts can have widely varying oxide content even if the material is obtained from the same source. The variations are dependent on processing methods as well as storage practices. For example, as a waste, cement kiln dust (CKD) can be stored for long periods and that portion exposed to the air in the atmosphere can "air slake", that is, react with moisture in the atmosphere to form calcium hydroxide thereby depleting the calcium oxide content. Laboratory testing of raw materials should assure sufficient oxide content to react stoichiometrically with free water to produce the exothermic reactions.

Additionally, material component ratios can be varied dependent on the product dryness required or final product temperature necessary to meet regulatory agency standards. For example, pasteurization is an accepted "add on" process to meet USEPA standards, said process requiring temperatures of 70° C. for 30 minutes, which specifications can readily be met using the new method.

Due to the many variations of the waste material and the desired variations of the product for various beneficial uses, initial laboratory testing will be required to determine the proper ratios of waste sludge, alkaline materials and carbon dioxide.

For economy in quicklime usage, kiln dusts containing calcium oxide can be used as an alternate to quicklime or as an admixture with quicklime to provide the necessary total calcium oxide content to react stoichiometrically with each 0.32 pounds of water in the waste sludge. As mentioned previously, the cement kiln dust (CKD) also serves to increase the dry solids content of the product through the reaction of other oxides, such as magnesium oxide, contained in the CKD, and also provides nutrients for beneficial use of the product.

The discovery that the exothermic reaction between the water of the waste material and the alkaline earth oxides is retarded and delayed when including carbon dioxide gas is important from the standpoint of blending accuracy. Depending upon the amount of kiln dust added as a "filler", the blended material in the blender can form as a granule, pellet, or heavy paste. In either case, while complex reactions might be taking place, there is no visible changes of stage or state after the commingling of materials to form said granules, pellets or paste. The time period to accomplish accurate blending of charged materials can be up to 5 minutes. The result of this inaction is that all materials are intimately in contact with each other so that all particles of materials are thoroughly reacted when the exothermic reaction initiates later.

It should also be noted that as the carbon dioxide gas expands in the blender, it blankets the blender with the carbon dioxide and thereby excludes or minimizes air entrance into the system. As in the case of the oxides, the amount of carbon dioxide added is in proportion to the molecular weight of the resultant products as per formulas of the chemical reactions following hereinafter.

As discharged from the blender 1, the blended materials are approximately room temperature, but a temperature not higher than 10° F. above room temperature. (This slight increase could result from the viscous material blending wherein electrical energy of the drive 2 is converted to heat energy in the product.) The appearance is a dark gray, sludge-like intermediate which is continuously discharged from the blender 1 after a retention time ranging from 20 seconds to 5 minutes, the preferred retention time being one minute.

Accurately blended components are discharged from the blender 1 into a holding hopper 3, hereinafter named the exothermic reaction chamber. The chamber is vented, using vent 4, and under atmospheric pressure conditions. The volume of the exothermic reaction chamber must be sufficient to contain discharged material for a delayed period of time until the exothermic reaction is initiated and completed. Additionally, 100% additional volume of the chamber is required to allow for a dramatic change in the bulk density of the reacting material.

Air pads 5 are provided on the sloping walls of the discharge section 6 of the exothermic reaction chamber. Air pads provide a dry air purge of the chamber to purge water vapor, excess carbon dioxide, and noxious volatile odors.

A rotary lock feeder discharges the reacted, free flowing product from the exothermic reaction chamber at a material flow rate, set by a variable speed drive 8, proportional to the volumetric flow rate of materials charged into the system and allowing for the decrease in bulk density of the product.

Exothermic reaction chamber 3 is alternately suited for vacuum operation. Another major advantage of the new method is that the waste materials can be accurately blended under atmospheric conditions, without apparent reaction, and delivered to a vacuum system wherein evaporation and boiling point of water contained in the intermediate material can be reached, more violently, at lower pressure, when the exothermic reaction is initiated. For example, it is well known that the boiling point of water at 14.7 psia is 212° F./100° C. At 5 psia, the boiling point is 162.3° F./72.2° C. Therefore, if the exothermic reaction chamber is maintained at 5 psia, the exothermic reaction which is actually capable of reaction temperatures to 117° C., need only reach above 72.2° C. to accomplish the removal of water or alternately to meet standards for pasteurization.

Under vacuum operation, vent 4 is converted to a vacuum connection to a conventional vacuum pumping system. Additionally, the connection 9, between the blender and the exothermic reaction chamber must include a pressure lock 10, to maintain vacuum conditions. Pressure lock 10 can be a conventional, motor driven, rotary lock if the intermediate blended material is granular or pelletized, or alternately, can be a progressive cavity pump for pasty material, such as the commercially available Moyno Pump.

The resultant product 11 is continuously discharged from the exothermic reaction chamber as a free flowing, off-white powder or granule, ranging from 20 mesh to 100 mesh, which after the reaction is primarily composed of organic constituents and calcium carbonate constituents, the calcium carbonate preferred for land application as compared to hydrated lime since it degrades more slowly to supply alkalinity to the soil over longer time periods.

For a better understanding of the reactions that take place, and an explanation for the violent reaction that produces temperatures exceeding the boiling point of water, a review of the chemical reactions that simultaneously take place, some being reversible, are as follows:

1. Calcium oxide (quicklime) added to settled or dewatered sludge reacts with the free water in the sludge to form calcium hydroxide plus heat.

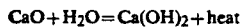
$$CaO + H_2O = Ca(OH)_2 + heat$$

2. Carbon dioxide reacts with free water in the sludge to form carbonic acid. However, carbonic acid reaches saturation readily and releases carbon dioxide.

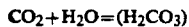
$$CO_2 + H_2O = (H_2CO_3)$$

3. calcium hydroxide formed in reaction 1 reacts with carbon dioxide to form calcium carbonate and water.

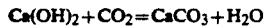
$$Ca(OH)_2 + CO_2 = CaCO_3 + H_2O$$

4. Calcium oxide, or other oxides contained in the kiln dusts, react with carbon dioxide to form carbonates, such as calcium carbonate. High exothermic heat is generated from this reaction.

$$CaO + CO_2 = CaCO_3 + high\ heat$$

It should also be noted that intermediates, such as bicarbonates, can be formed, but these reactions are driven in the direction to eventually react to carbonates.

To further review the process, generally 5 to 45% by weight of calcium oxide, either 100% calcium oxide or an admixture of quicklime and kiln dust so blended to have a reactive content of oxide of 5 to 45% by weight, is combined with the waste sludge. The amount of carbon dioxide is determined by laboratory test, the objective of the laboratory test being to retard the exothermic reaction for at least 5 minutes with delayed exothermic reaction reaching the desired temperatures. Generally, this amount of carbon dioxide can range from 2% to 30% of the weight of sludge plus calcium oxide, not including the weight of any inactive filler materials such as inactive nutrients added for agricultural purposes.

When the blended constituents are delivered to the exothermic reaction chamber, a surprising and unexpected phenomenon was discovered. After a delay, which could range from 5 to 20 minutes, a violent, exothermic reaction is initiated. Since all constituents of the blended materials are in intimate contact, the reaction takes place throughout the mass of the entire material, producing a violent percolation of material as gases escape from the reacted product. Gases are water vapor, excess carbon dioxide if any and volatile noxious odor producing gas. The temperature resulting from the exothermic reaction can reach temperatures exceeding the boiling point of water. For example, a temperature of 117° C. was obtained at atmospheric pressure conditions. The gases are vented through vent 4 to conventional scrubbing equipment.

The resultant product converts from a sludge-like appearing material to a free flowing, off-white powder ranging from 20 mesh to 100 mesh. The product contains the organic constituents, carbonates and nutrients for beneficial uses. The product is also converted to an innoxious material by the conversion of noxious producing components in the waste, such as sulphur, to insoluble sulphate salts by the reaction of the sulphate ion with the calcium oxide. Also, volatile noxious odors are driven off by the high temperature.

The resultant product can be further processed if necessary to satisfy a variety of applications. The 20 mesh to 100 mesh material can be blended with other nutrients to improve its value as a fertilizer. Also, using conventional agglomeration equipment, the product can be formed into micro-pellets, granules or pellets to suit a specific application.

Most importantly, the waste material is uniformly sterilized by the new method. Sterilization occurs by the high temperature destruction of pathogens, the high dry solids content exceeding 90% dry solids (less than 10% moisture and generally less than 5% moisture) and a combination of temperature and dryness such that the process can be demonstrated to produce a beneficial product from waste materials which product meets or exceeds USEPA standards for PFRP, Process to Further Reduce Pathogens. With no pockets of high moisture, the product can be packaged and shipped long distances, without fear of degradation, to third world countries to supply beneficial use for arid and non-productive land.

Various modifications and changes may, of course, be made as will be apparent to those skilled in the art. As an example, although the applicant's patented blender-reactor is well suited and highly advantageous to use, other suitable embodiments of conventional mixers may also be used, particularly when the material to be processed is non-hazardous, such as food waste, and additionally is more easily handled from a material handling and mixing the standpoint as compared to say fibrous sludge.

Also, while the present application illustrates a method from waste sludge, such as municipal wastewater treatment plant sludge, and animal excrement or process wastes, the method is equally adaptable to food wastes such as waste from fish processing, produce processing or meat packing industries.

Thus, while the aforementioned embodiments of the present invention have been shown and described, it will be obvious that many changes and modifications may be made thereunto, without departing from the spirit and scope of the invention.

What is claimed is:

1. A method for sterilizing, beneficiating, and drying waste materials such as wastewater treatment plant sludge, animal excrement, or process wastes, comprising the steps of:

settling and/or dewatering the waste material to provide a sludge cake containing 4% to 60% by weight of dry solids, and 40% to 96% by weight of liquids;

blending and reacting said sludge cake with alkaline earth metal oxides, admixtures of alkaline earth metal oxides, and carbon dioxide, all as reactants in a blending container whereby exothermic reaction between the constituents and intermediate reaction products is retarded;

overflowing the blended constituents from the blending container into a reaction chamber, at atmospheric pressure in the presence of oxygen, thereby causing an exothermic reaction between the water, alkaline earth oxides, carbon dioxide and intermediate reaction products, which initiates after a retention time in the system ranging up to 20 minutes and generally from 5 to 20 minutes;

allowing the temperature resulting from the complex exothermic reactions to rapidly rise in the reaction chamber from room temperature to over 100° C., exceeding the boiling point of liquids entrained in the blended constituents, and ranging up to 117° C.;

allowing the moisture content of the reacted constituent which was originally the moisture content of the dewatered sludge cake, namely 40% to 96% moisture, to be evaporated and reduced to a final moisture content ranging from 50% to 10% or less;

percolating the constituents to allow water vapor to escape from every reacted particle, as the temperature, due to the reaction, uniformly reaches the boiling point of the liquid within each particle, thereby causing sterilization of said constituents by the relatively high temperature of the exothermic reaction; and following the completion of the exothermic reaction, discharging the reacted constituent product from the reaction chamber.

2. The method according to claim 1, wherein said alkaline earth metal oxides added to the blending container are selected from the group consisting of calcium oxide (quicklime), kiln dusts such as cement kiln dust or lime kiln dust, or admixtures of the aforesaid materials.

3. The method as recited in claim 2, wherein the amount of calcium oxide is 5% to 45% by weight of the waste sludge, and the kiln dust is 2% to 200% by weight depending upon the free calcium oxide content or the amount of filler material added to assist in drying the sludge.

4. The method according to claim 1, whereby said step of blending takes place at a temperature between 20°-30° C.

5. The method according to claim 1, wherein in said blending step, said carbon dioxide is in the form of a gas or alternately in the form of a solid (dry ice), which solid sublimes into carbon dioxide gas, said $CO_2$ being up to 30% by weight of the mol. weight of the blended constituents in the blender.

6. The method according to claim 1, comprising venting the vapors and gases from the reaction chamber and scrubbing the vapors and gases to render them innoxious.

7. The method according to claim 6, whereby the vapors and gases are withdrawn through a vacuum system and made innoxious by conventional equipment.

8. The method according to claim 7, wherein the pressure of said reaction chamber is a vacuum thereby enabling the evaporation of liquid at lower temperatures.

9. A method according to claim 1, wherein the ratios of the constituents charged into the blending container can be varied to result in constituents having a moisture content from between 50% moisture to 3% moisture.

10. The method as recited in claim 1, wherein the time of the exothermic reaction in the reaction chamber varies between 5 to 20 minutes.

11. A product produced by the method according to claim 1 comprising a soil conditioner and fertilizer supplement for agricultural use having a particle size ranging from 20 to 100 mesh.

12. The product as recited in claim 11, further comprising processing the material into granules, micro-pellets or pellets using conventional agglomeration equipment and binders.

13. The product according to claim 12, wherein the bulk density of the resulting product is reduced by 30 to 80%.

14. The product according to claim 11, having a resulting dryness of between 90 to 95%.

15. The method according to claim 1,
   wherein said reacted constituent has a moisture content of 10 percent or less and is free of pathogens and microorganisms due to the high temperature of the reaction, in excess of 100° C. up to 117° C., and the dryness of the constituent.

16. A method for sterilizing, beneficiating, and drying waste materials such as wastewater treatment plant sludge, animal excrement, or process wastes comprising the steps of:

settling and/or dewatering the waste material to a moisture level between 4% to 60% by weight of dry solids;

blending and reacting the waste material with alkaline earth metal oxides or admixtures thereto with carbon dioxide so as to substantially exclude oxygen from the blended constituents, said carbon dioxide retarding the exothermic reaction between the constituents;

removing the carbon dioxide following said step of blending and reacting and allowing the constituents to undergo an exothermic reaction between the water and the alkaline earth oxides, the temperature resulting from the exothermic reactions rising to exceed the boiling point of the liquids entrained in the blended constituents and ranging from in excess of 100° C. up to 117° C.;

allowing the constituents to percolate and venting the water vapor from the particles of constituents to permit the constituents to undergo sterilization by the relatively high temperature caused by the exothermic reaction to produce a final moisture content ranging from 50% to 10% or less; and cooling the constituents following the exothermic reaction and discharging the reacted constituent.

17. The method as recited in claim 16, wherein said reacted constituent has a moisture content of 10% or less and is free of pathogens and microorganisms due to the high temperature of the reaction and the dryness of the constituent.

18. The method according to claim 16, wherein said reacted constituent has a moisture content of 10 percent or less and is free of pathogens and microorganisms due to the high temperature of the reaction, in excess of 100° C. up to 117° C., and the dryness of the constituent.

19. A method for sterilizing, beneficiating and drying waste materials such as wastewater treatment plant sludge, animal excrement, or process wastes comprising the steps of:

settling and/or dewatering the waste material to a moisture level between 4 percent to 60 percent by weight of dry solids;

blending and reacting the waste material with alkaline earth metal oxides or admixtures thereof with carbon dioxide, so as to substantially exclude oxygen from the blended constituents, said carbon dioxide retarding the exothermic reaction between the constituents;

removing the carbon dioxide following said step of blending and reacting and allowing the constituents to undergo an exothermic reaction between the water, the alkaline earth oxides and the carbon dioxide, the temperature resulting from the exothermic reactions rising to exceed the boiling point of the liquids entrained in the blended constituents;

allowing the constituents to percolate and venting the water vapor from the particles of constituents to permit the constituents to undergo sterilization by the relatively high temperature caused by the exothermic reaction; and cooling the constituents comprising organic constituents and calcium carbonate constituents following the exothermic reaction and discharging the reacted constituent; and wherein said reacted constituent has a moisture content of 10 percent less and is free of pathogens and microorganisms due to the high temperature of the reaction, in excess of 100° C. up to 117° C., and the dryness of the constituent.

* * * * *